United States Patent [19]

Buller-Colthurst et al.

[11] Patent Number: 4,658,718

[45] Date of Patent: Apr. 21, 1987

[54] HOLDER FOR PROCESSING PRODUCTS

[75] Inventors: Guy E. Buller-Colthurst, Erin; Knud Jespersen, Terracotta, both of Canada

[73] Assignee: Knud Simonsen Industries Limited, Rexdale, Canada

[21] Appl. No.: 770,582

[22] Filed: Aug. 29, 1985

[51] Int. Cl.$^4$ ............................................... B30B 7/02
[52] U.S. Cl. .................................... 100/194; 17/44.2; 99/351; 100/265; 100/910
[58] Field of Search ............... 100/194, 910, 265, 910; 99/349, 351; 17/44.2

[56] References Cited

U.S. PATENT DOCUMENTS

| | | | |
|---|---|---|---|
| 3,473,465 | 10/1969 | Tonjum | 100/194 |
| 3,618,511 | 11/1971 | Matthews | 100/194 |
| 3,750,563 | 8/1973 | Tonjum | 100/194 |
| 4,341,154 | 7/1982 | Orlowski | 100/194 |

Primary Examiner—Billy J. Wilhite
Attorney, Agent, or Firm—George A. Rolston

[57] ABSTRACT

A product press, for supporting product during processing, and having a support frame, at least one fixed tray member fixed to the support frame, at least one movable tray movable towards and away from the fixed tray for holding product, biasing means urging the movable tray towards the fixed tray for applying pressure to product stored therebetween, and means for releasably holding the trays apart.

7 Claims, 7 Drawing Figures

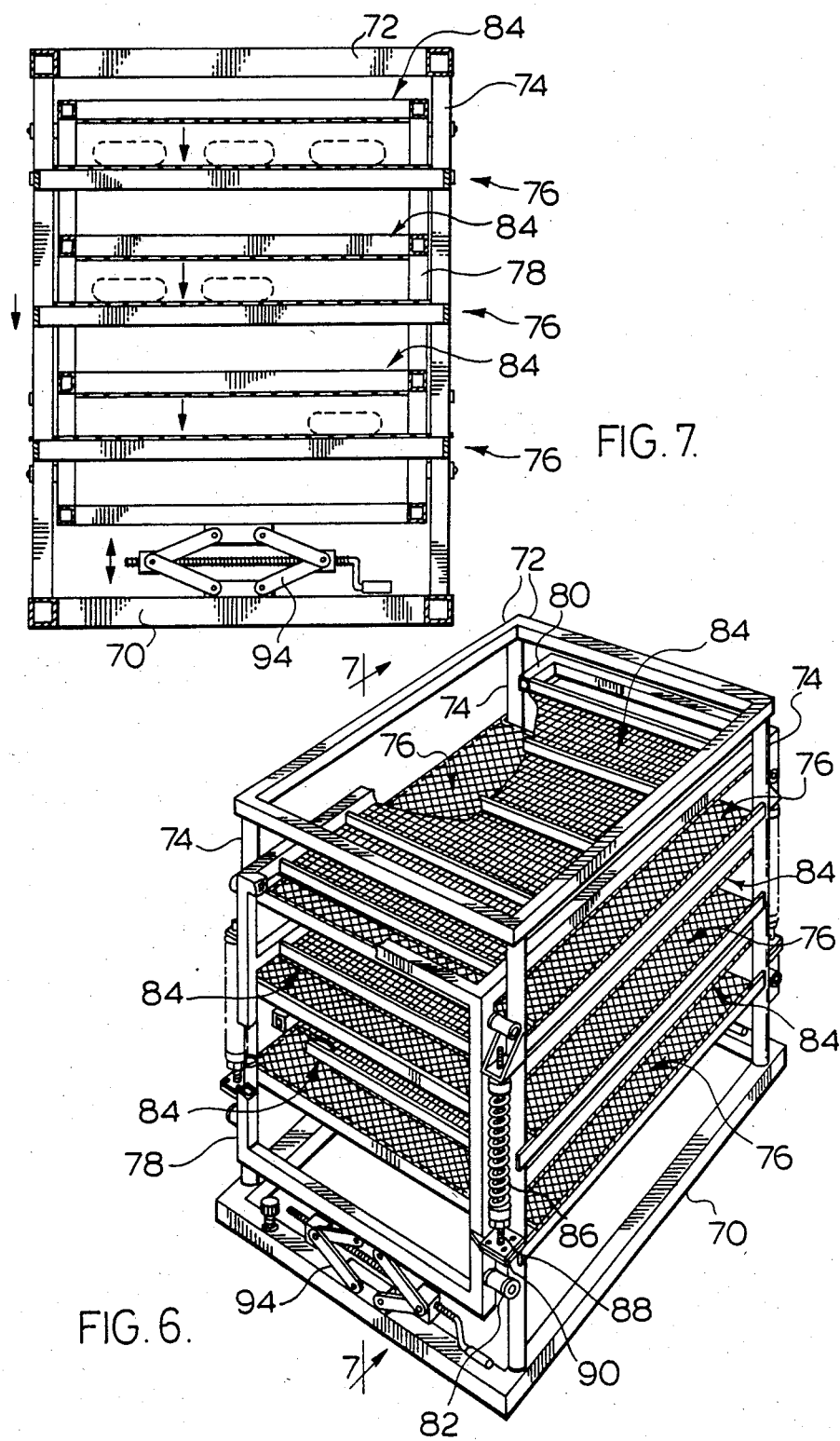

HOLDER FOR PROCESSING PRODUCTS

The invention relates to a product holder for holding products during processing, while subjecting the same to pressure, and is of particular application to the processing of meat products, such as during curing, smoking, cooking and the like.

BACKGROUND OF THE INVENTION

Products, such as meat products and the like, are required to be held under a predetermined pressure, during processing in a variety of ways such as curing, smoking, cooking and the like. Such products may be processed in batches, or on some form of moving conveyor, depending upon the type of processing and the equipment available. In either case, however, it is essential that such products be packed into predetermined shapes and maintained under pressure during such processing. Since such processing may cause some shrinkage or swelling of the product, it is desirable that the product shall be subjected to pressure in such a way that if, for example, shrinkage takes place, the pressure will be maintained, and alternatively, if swelling takes place the pressure will not increase.

It is also essential that the products may be freely exposed to the atmosphere within the processing equipment. In some cases this may be necessary simply to remove vapourized moisture. In other cases it will be necessary in order that the heated atmosphere within the processing chamber, for example, shall be free to circulate completely around such products.

While different forms of equipment such as presses, and containers capable of applying pressure to products such as meat products, have been available for many years, they are not capable of fulfilling all of these various objectives.

In the case of typical processed or cooked meat products, such as hams and the like, the meat is removed from the bone, and separated into sections. The sections are then treated usually by injecting a solution such as brine, and then by massaging. The sections are then packed into casings made of a permeable material. Such stuffed casings are then placed in presses having upper and lower plates squeezing the stuffed casings so that the upper and under surfaces are flattened, and causing the sides to bulge. These presses are then passed through a processing chamber for cooking, smoking or the like.

This procedure involved considerable handling of product, and manipulation of small presses. In addition, the presses tended to obstruct free flow of atmosphere, smoke, etc. within the processing chamber, so that the product was subject to some degree of variation in treatment.

As meat processing lines become larger, and more complex, it is desirable that the presses shall be capable of handling larger volumes of product. At the same time, it is essential that the presses shall be of such a design that they may be easily loaded and unloaded with meat product, and also attached and detached from whatever conveyor system is used. It is also desirable to improve the free flow of atmosphere around the product. It is also essential that they should be capable of being cleaned and sterilized.

BRIEF SUMMARY OF THE INVENTION

With a view to satisfying these various objectives, the invention comprises a product press, for supporting product during processing, and having support frame means, at least one fixed tray member fixed to said support means, at least one movable tray member movably connected to said support means and movable towards and away from said fixed tray member for holding product therebetween, openings formed in said tray members, biasing means urging said movable tray member towards said fixed tray member, for applying pressure to product stored therebetween, and means for holding said tray members apart.

The invention further comprises the use of a plurality of fixed tray members and movable tray members arranged in pairs, and means joining said movable tray members for movement in unison.

The invention further comprises an adjustable stop member for restraining movement of said movable tray members at a predetermined point.

The invention further comprises movement means for moving said movable tray members away from said fixed tray members, to facilitate loading and unloading of said tray members with said product.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 6 is a perspective of an alternate embodiment, and,

FIG. 7 is an end elevation of FIG. 6.

DESCRIPTION OF A SPECIFIC EMBODIMENT

Figure 1:
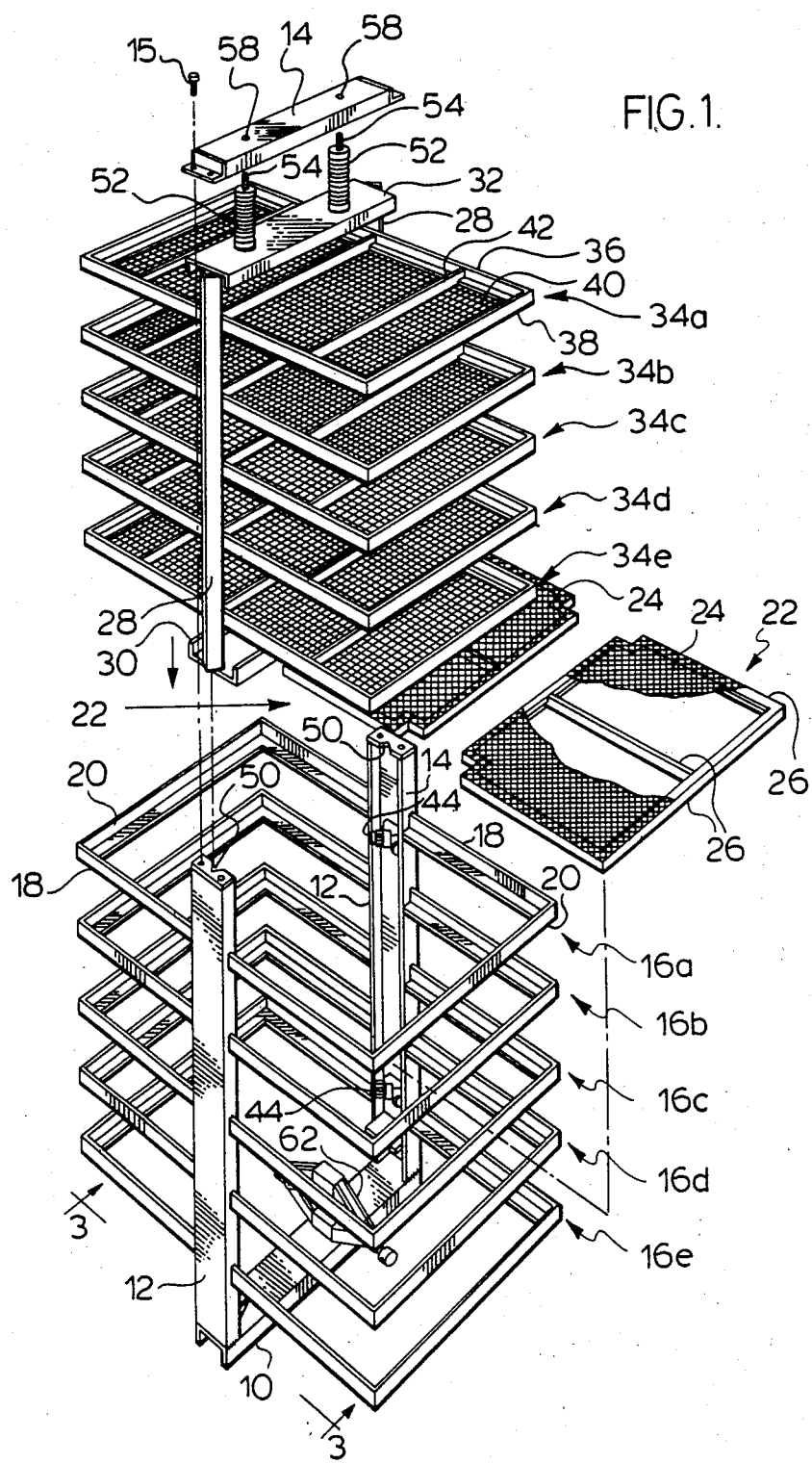
FIG. 1 is a perspective exploded illustration showing a press according to the invention, with parts thereof cut away to reveal the construction.
Figure 2:
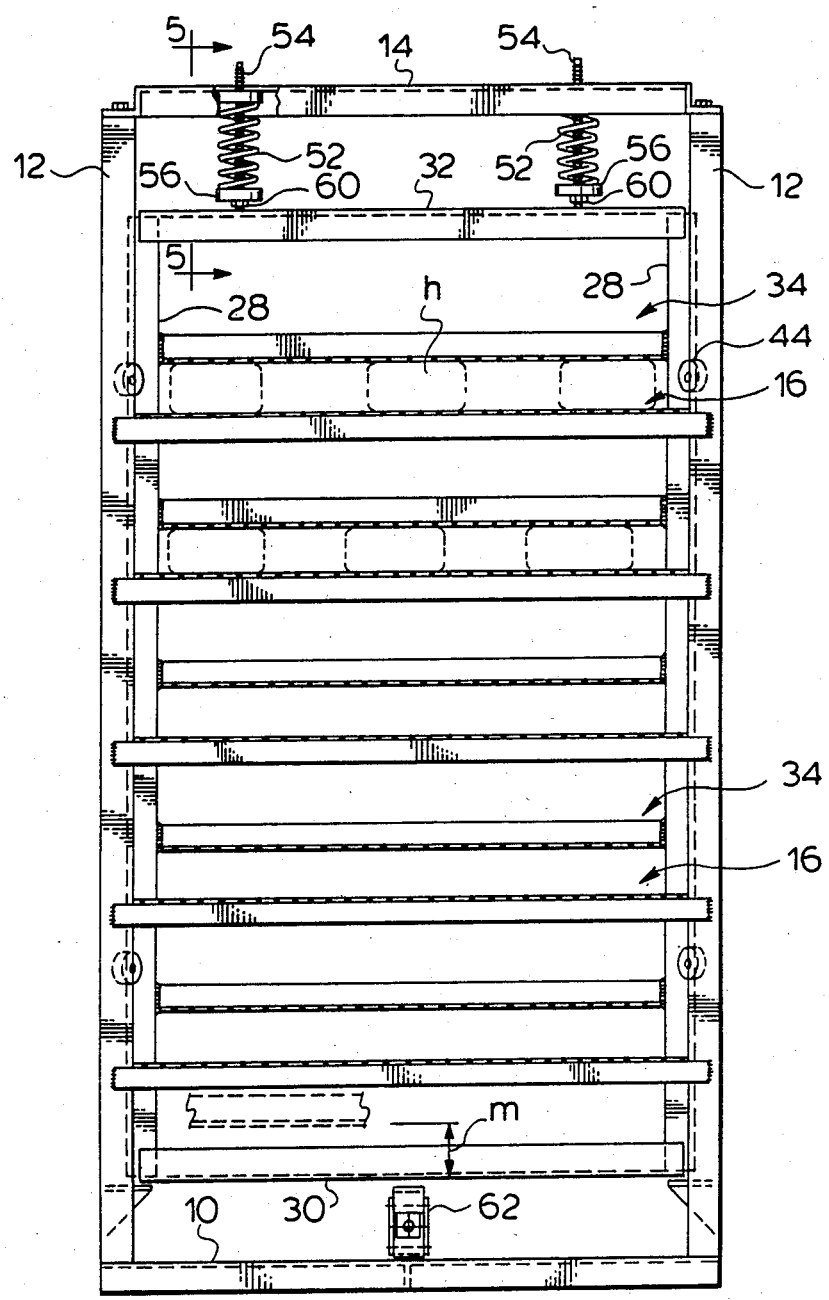
FIG. 2 is an end elevation of the press.
Figure 3:
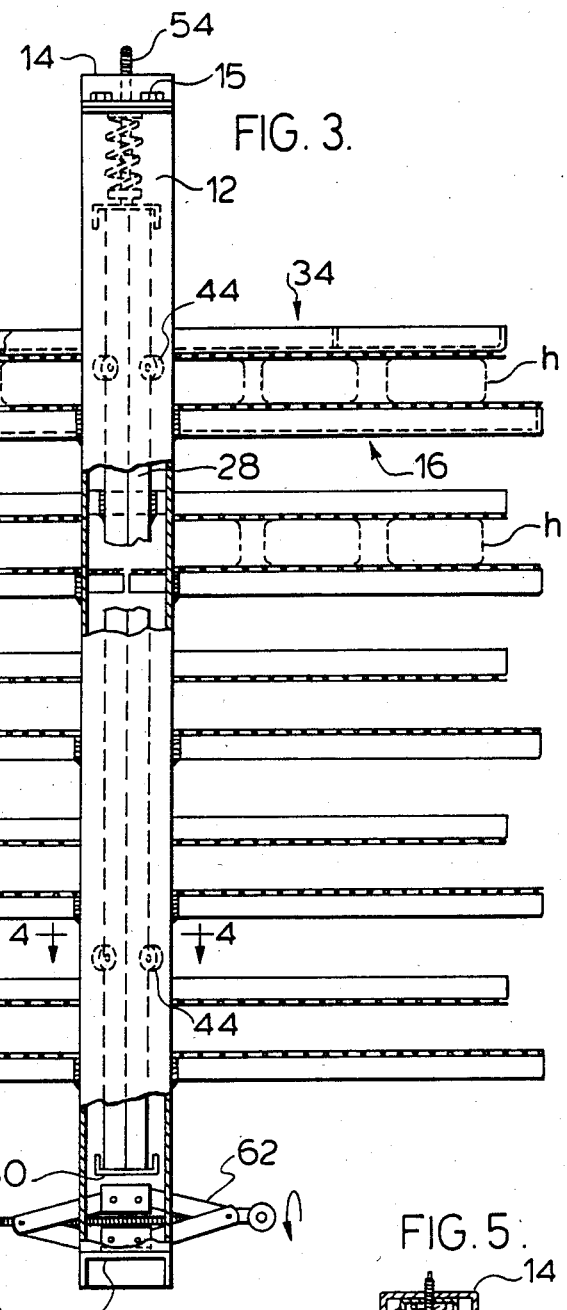
FIG. 3 is a side elevation along the line 3—3 of FIG. 1.
Figure 4:
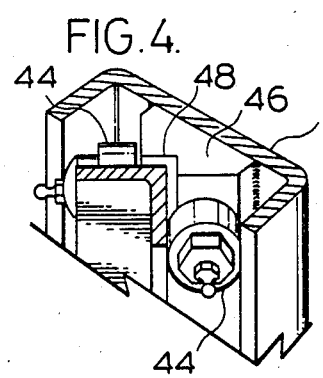
FIG. 4 is an enlarged detail of a portion of the press of FIG. 1.
Figure 5:
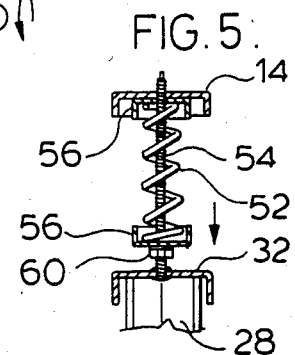
FIG. 5 is a section along 5—5 of FIG. 2.

Referring now to FIGS. 1 to 5, the invention is illustrated by a preferred embodiment which will be seen to comprise a support means in the form of a rectangular open framework having a bottom frame portion 10, two side posts 12 and a removable upper frame portion 14. The posts 12 are attached at the corners of the bottom frame portion, and are typically of channel shape. Releasable fastenings such as bolts 15 secure portion 14 to posts 12. The invention is obviously not restricted to the particular design or construction of support means, however, the form illustrated being merely by way of example.

Attached to the two side posts 12 are a plurality of fixed trays 16a, 16 b, 16c, etc. Five such fixed trays are shown in this illustration. However, it will of course be appreciated that different numbers of such trays can be used, and conceivably a single such tray might be used in certain circumstances.

Trays 16 will be seen to be formed in two halves each of which has side members 18 and an end member 20. Side members 18 are fastened to the side posts 14 and form an open frame. Two panels 22 of open mesh rigid wire screen are releasably supported within members 18 and 20. Panels 22 are formed of wire mesh 24 supported by struts 26, forming a supporting framework, and are removable.

Located within the space enclosed by the upper and lower frame portions 10 and 14 and side posts 12 is a generally rectangular movable frame comprising two side frames 28, lower cross member 30 and upper cross member 32. Side frames 28 in this embodiment are formed of angle section material shaped and profiled to provide guidance surfaces.

A plurality of movable trays 34, in this case five such trays, are supported on the movable frame. Each such tray is comprised by respective pairs of side bars 36 extending between side frames 28 and end bars 38. Each tray supports a rectangular panel of rigid wire mesh material 40. A plurality of bracing struts 42 extend between bars 34 for supporting such panels of wire mesh material so as to maintain a rigid flat tray structure.

Thus it will be seen that the entire assembly comprising the side frames 28, together with the movable trays attached thereto, are all movable in unison. Guide means such as guide rollers 44 are mounted in side posts 12, in this embodiment. Rollers 44 are arranged in pairs on pads 46, located on axes at right angles to engage the outer surfaces of side frames 28. Angled notches 48 are formed in pads 46 to receive side frames 28, and similar notches 50 are formed at the upper ends of side posts 12. In this way the trays 34 are movable in unison relative to trays 16.

Downward movement will bring the respective movable trays 34 into closer proximity with their respective fixed trays 16, and product packed on such fixed trays will thus be compressed by such movement.

In order to apply graduated and controllable pressure in this way, biasing means are provided, in this case in the form of springs 52. Springs 52 are compression springs, and are mounted on upper frame portion 14.

Threaded rods 54 are threadedly fastened in washers 56, and pass upwardly through the centres of springs 52. Rods 54 pass freely through holes 58 formed in upper frame 14. An adjustable retaining nut 60 permits the springs 52 to be shortened or lengthened, thereby varying the pressure applied to the movable frame cross member 32.

In this way it is possible to adjust and regulate the amount of spring pressure applied by the trays 34, to product packed on fixed trays.

In order to open up the spacing between the trays to facilitate packing, loading and unloading, any suitable movement means may be provided, such as scissors jack 62 which may operate between, for example, the lower frame 10, and the movable lower cross member 30.

Such a movement means is, however, merely shown by way of example. A variety of different movement means may be used for the same purpose.

The principle object is merely to force the movable frame and movable trays 34 upwardly away from the fixed trays, and hold them in such extended position, thereby facilitating loading and unloading of the trays.

In operation, the trays are opened up, for example, by the movement means 62, forcing the movable trays 34 upwardly. Product is then packed on the fixed trays 16 and suitably arranged. For example, if desired, a variety of spacers or plates (not shown) may be placed between rows of product, in a variety of different ways. The movement means 62 is then released, and the springs 52 will then force the upper cross member 32 and side frames 28 downwardly, bringing the movable trays 34 into contact with product lying on the trays 16.

By suitably adjusting nuts 60, the degree of pressure can be varied, and overpressure can be prevented.

The press can then be placed in a processing chamber, or placed on a conveyor passing through such a chamber, or can be suspended from an overhead conveyor rail by any suitable suspension means (not shown).

It will be noted that if desired, such presses can be stacked one above the other, without interfering with the free flow of air or processing atmosphere—i.e. air containing a smoke mixture for example. Such air or gases can pass freely around the product held between each pair of trays. In addition, since the trays themselves will be located spaced away from the lower and upper frames, there is adequate free air space.

Once processing has been completed, the trays are then opened up once more by suitable movement means such as the jacks 62, and the product is removed. The whole unit can then readily be cleaned with a hot water spray, and sterilized as necessary ready for re-use.

For this purpose, or for servicing, the panels 22 can simply be lifted out of trays 16. Frame 14 can be released, and the entire assembly of movable trays 34 and frame 28-30-32 can then be raised upwardly, and removed. Trays 34 having smaller overall dimensions than trays 16 will simply pass through trays 16.

Such a procedure would not normally be used every time the press is cleaned but the feature greatly facilitates assembly, servicing and maintenance whenever required.

FIGS. 6 and 7 show an alternate embodiment in which the support means is in the form of a rectangular open framework having a rectangular bottom frame 70, and a rectangular upper frame 72, and four side posts 74. The posts 74 are arranged more or less at the corners of the bottom and top frames, and are preferably of cylindrical shape.

Attached to the four side posts 74 are a plurality of fixed trays 76. Located within the space enclosed by the upper and lower frame members 70 and 72 and side posts 74 is a generally three-sided movable support comprising two generally open-sided rectangular side frames 78 and joined by upper cross members 80. Side frame members 78 are provided with four guide rollers 82 which are shaped and profiled to ride on the cylindrical side posts 74.

A plurality of movable trays 84 are supported on the movable support member. Thus it will be seen that the entire assembly comprising the side frames 78, together with the trays 84 are all movable in unison, being guided by engagement of rollers 82 on side posts 74.

In order to apply graduated and controllable pressure biasing means are provided, in this case in the form of springs 86, at each corner.

A threaded rod 88 is fastened to each of brackets 90, and passes upwardly through the centre of springs 86, and passes freely through holes in fixed brackets 92.

Suitable retaining cups and adjustable nuts permit the springs 86 to be shortened or lengthened, thereby varying the pressure applied.

In order to open up the spacing between the trays to facilitate packing, loading and unloading, any suitable movement means may be provided, such as scissors jack 94.

Such a movement means is, however, merely shown by way of example, and a variety of different movement means may be used for the same purpose.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A product press, for supporting product during processing, and comprising;
    support frame having two frame side members, and lower and upper cross-members;
    a plurality of fixed tray members fixed to said support frame side members at spaced intervals, said fixed tray members having two ends, and said frame side members being attached thereto midway between said ends;
    a moveable frame having two side portions, and lower and upper cross portions, located between said support frame side members, and moveable relative thereto;
    a plurality of movable trays fastened to said moveable frame side members at spaced intervals and being movable towards and away from said fixed tray members for holding product therebetween;
    biasing means urging said movable trays towards said fixed tray members for applying pressure to product sotred therebetween, and,
    means for releasably holding said trays and tray members apart.

2. A product press as claimed in claim 1 wherein said biasing means extends between said support frame means and said movable frame.

3. A product press as claimed in claim 2 wherein said holding means extends between said support frame means and said movable frame.

4. A product press as claimed in claim 3 wherein said movable frame fits within said support frame means and including guide means on said support frame side members and said movable frame side portions interengageable with one another whereby to guide said moveable frame along a linear path aligned with said support frame side members.

5. A product press as claimed in claim 4 wherein said support frame means includes a removable frame portion normally enclosing said movable frame, and being detachable to permit removal of said movable frame.

6. A product press as claimed in claim 1 wherein said fixed tray members each comrpise an outer tray framework defining an opening therethrough, and removable tray panel means releasably supported on said outer tay framework.

7. A product press as claimed in claim 6 wherein said movable trays have dimensions smaller than said outer tray framework whereby said movable trays may be passed through said outer tray framework.

* * * * *